April 26, 1966   H. E. McKELVEY   3,248,196
METHOD AND APPARATUS FOR BENDING GLASS
Original Filed June 21, 1954   5 Sheets-Sheet 1

INVENTOR
HAROLD E. McKELVEY
BY
Oscar L. Spencer
ATTORNEY

April 26, 1966  H. E. McKELVEY  3,248,196
METHOD AND APPARATUS FOR BENDING GLASS
Original Filed June 21, 1954  5 Sheets-Sheet 2

INVENTOR
HAROLD E. McKELVEY
BY
Oscar L. Spencer
ATTORNEY

April 26, 1966  H. E. McKELVEY  3,248,196
METHOD AND APPARATUS FOR BENDING GLASS
Original Filed June 21, 1954  5 Sheets-Sheet 5

INVENTOR
HAROLD E. McKELVEY
Oscar Spencer
ATTORNEY

United States Patent Office 3,248,196
Patented Apr. 26, 1966

3,248,196
METHOD AND APPARATUS FOR BENDING GLASS
Harold E. McKelvey, New Kensington, Pa., assignor to Pittsburgh Plate Glass Company, a corporation of Pennsylvania
Original application June 21, 1954, Ser. No. 438,011. Divided and this application Dec. 11, 1959, Ser. No. 858,928
5 Claims. (Cl. 65—107)

This application is a division of my copending application Serial No. 438,011 filed June 21, 1954, now abandoned.

This application relates to an improved method and apparatus for bending glass, and specifically refers to improved bending molds of the female skeleton type designed especially for bending glass to complex shapes. The molds described herein impart a comparatively shallow bend centrally of the glass sheets. These shallow bends merge into intermediate portions where the radius of curvature of the bends diminishes rapidly. The extremities of the glass are bent to such a degree that the tangent to the surface of the bent glass is rotated on the order of 90 degrees from the tangent to the center of the glass. In addition, the opposed lateral edges of the glass extremities may be bent to different degrees of curvature, thus imparting a conical bend in these regions.

Glass bending molds comprising a center section fixed relative to a mold supporting member and spaced opposing wing sections, each located at either longitudinal extremity of the fixed center section, each pivotable about an axis to a spread position to support a flat sheet of glass spanning the mold and rotatable into a closed position providing a continuous skeletonized surface having the desired contour of the bent glass are well known, as seen in Patent No. 2,330,349 to Henry J. Galey. In such molds, the wing sections are counterweighted to produce bending moments tending to rotate the wing sections from the spread position to a closed position. Such molds were developed initially for bending relatively small sheets of glass into comparatively shallow cylindrical curves. Today, the requirements of automobile manufacturers demand larger sheets of glass shaped to very complex bends. These additional requirements bring out certain latent deficiencies in bending molds of the type previously acceptable, unless certain additional precautions not required previously are taken.

According to the prior art, bending of glass sheets is accomplished by heating flat glass sheets supported between stop members located at the longitudinal outboard extremities of the wing sections of the mold. Heat is applied to the glass, the glass softens, and the bending moments supplied by the weights close the mold, the heat softened glass moving to conform to the continuous skeleton structure resulting from closing the mold by a combination of heat sagging and force applied to the glass extremities via the stop members. The entire glass sheet is slid into alignment with the closing mold.

Unless both ends of the flat glass sheets sag and slide equally during the bending operation the sheet may get out of alignment with the mold. In cases where it is desired to bend small glass sheets into cylindrical curves, any misalignment due to unequal sagging or unequal sliding, or both, does not affect the curvature of the finished product materially. However, when bending to complex curvatures is desired, any misalignment of the glass due to non-uniform sliding of the glass on the mold as the mold moves from open to closed position results in the formation of undesired curvatures in the glass due to the difference in size of the extremities of the misaligned glass. This error in curvature is magnified with larger sheets and more complex curvatures.

Prior to recent design changes in automobile windshields and backlights, the location of the hinges upon which the wing sections rotate and the relative dimensions of the center section and wing sections as determined by the points where the wing sections are cut from the center section of the glass bending molds were not important. The hinges were commonly located in the plane intersecting the cuts between the longitudinal extremities of adjacent mold sections in prior art devices exemplified in U.S. Patent No. 2,551,607 to Joseph E. Jendrisak. The distance that a flat glass sheet is required to sag by gravity to conform to the shaping surface of the mold, even in its central portion where the sagging is at a maximum, is not critical for bending small sheets of glass to comparatively shallow cylindrical curves. When larger sheets are shaped to complex bends, this problem becomes considerable. The higher the flat glass sheet is placed relative to the central portion of the mold shaping surface, the greater is the relative sliding between the glass and the mold. This sliding tends to develop marks in the heat softened glass.

An outstanding improvement afforded by the present invention is to provide criteria for locating the positions for the inboard longitudinal extremities of the wing sections and the longitudinal extremities of the rails forming the central mold section and to locate the hinges about which the wing sections may be rotated. With optimum positioning of the longitudinal extremities or cuts and the hinges, flat glass may be mounted upon the open mold to be supported at its bottom surface only in relatively close proximity to the upper surface of the central section. Also, the location of the hinges about which the movable wing sections rotate from open to closed position of the mold is critical. These hinges must be located so that each wing section provides a closing moment which lifts the extremities of the softened glass sheet with a minimum of weight required, without elevating the initial position at which the flat glass must be placed upon the open mold.

Locating the flat glass sheet in close proximity to the central portion of the mold shaping surface enables the glass, when heated, to sag onto the latter with a minimum of relative sliding between the softened glass and the mold, which sliding causes marks to appear in the glass. The glass becomes fixed in position relative to the mold during the early stages of the bending cycle. Thus, the end portions of the softened glass are lifted upwardly by the rotation of the wing portions during the latter stages of bending, and relative movement tending to misalign the position of the glass sheet on the mold is minimized. Upward lifting of the extremities of the glass to final curved position combined with minimum sagging of the central portion of the glass produces minimum relative movement between the glass and the mold, further reducing sliding and misalignment.

The location of the cut between the wing sections and the center section is important. In bending flat glass sheets to curvatures having a relatively shallow bend at a central portion merging into areas where the radius of curvature diminishes rapidly to form extreme end portions in opposite planes substantially at right angles to the plane of the center portion, it is desirable to cut the wing portions from the main central portion in regions adjacent the regions of rapidly changing curvature and slightly longitudinally inwardly thereof. The further from the optimum cut points these cuts are made, the higher the wing sections lie above the center section when the mold is opened. The closer to the center these cuts are made, the greater is the possibility that large weights and moment arms will be needed to rotate the wing sections upwardly. Unless the cut points are located longitudinally inboard of the regions of rapidly changing curvature so that the plane of the mold surface at the cuts is substantially parallel with the glass, the sharp corners of the cut dig into the heated glass to mar it, or else to cause kinks which may not be removable.

In addition, the hinges about which these wing portions rotate are so located that the longitudinally outboard end of each wing section is in a horizontal plane which either intersects or is slightly above the plane defined by the extremities of the center section. The hinges are arranged in two pairs, each pair defining the ends of a hinge axis or pivot means traversing the center mold section adjacent and longitudinally inwardly of the outboard longitudinal ends of the latter. If the hinge locations are too far inside the extremities of the mold, an excessive amount of weight is required to close the mold. If the wing sections are pivoted about hinge axes that are outside of the optimum axes of positioning, the flat glass sets too high above the open mold.

If the hinge axes are located too low relative to the mold surface, the molds open too widely to support the length of the flat glass within the desired maximum vertical spacing between the flat glass and the upper surface of the center of the mold. Locating the hinges too high relative to the mold results in insufficient opening of the mold, thus causing the extremities of the flat glass to extend beyond the extremities of the open mold more than a desired maximum amount. In fact, when the mold is hinged above the flat glass surface, rotating shortens the mold, thus further increasing the overhang of the glass sheet mounted on the open mold.

Lessening the moment arm of rotation of the wing sections about the hinge axes raises the flat glass location over the central portion of the open mold. The moment arm of the wing section is determined by both the horizontal and vertical positioning of the hinge relative to the wing section. Therefore, this factor must also be considered in determining the optimum hinge locations.

The upper limit of the hinge location is determined by the plane of the mold surface. This limitation is determined by the necessity for subsequent tempering of certain sheets of glass after they are bent. When glass is tempered, the glass, while still supported on the mold in its bent position, is passed adjacent a plurality of movable nozzles which furnish blasts of air directed against the opposite surfaces of the bent glass sheet. If the hinges are located above the mold surface, they interfere with the freedom of movement of the tempering nozzles relative to the glass. This causes non-uniform tempering of the bent glass. To minimize this effect and also to lessen localized overheating due to the proximity of the hinge rods adjacent the glass, the hinge rods are either thinned or offset from the glass intermediate the hinges.

Another factor in determining hinge locations is the peripheral contour of the sheet to be bent. Usually, glass sheets to be bent are non-symmetrical about the longitudinal axis of the flat glass sheet. Glass sheets having pointed extremities are supported by the mold at two extreme opposite points, one at each extremity. Glass sheets having relatively blunt straight-sided portions adjacent their extremities are preferably supported along a line in a horizontal plane adjacent each extremity of the mold. When the glass is supported at extreme points, the extremities of the glass can usually be bent about hinges located on an axis substantially perpendicular to the longitudinal axis of the flat glass sheet. Such hinges are referred to as cylindrical hinges. Sheets supported by more than a single point at their extremities in the open position of the mold may require bending along hinge axes that are not perpendicular to the longitudinal axis of the flat glass sheet, but are obliquely disposed relative thereto. These hinges are referred to as conical hinges.

When a sheet of flat glass is laid upon a female type skeleton mold in the open position, the flat glass forms a span between the outer extremities of the wing portions of the mold. The increased size of windshields has provided such a long span between the mold extremities that the weight of the glass itself is sufficient in some cases to fracture the flat glass sheet spanning the mold. According to certain embodiments of the present invention, additional intermediate support points are provided on the mold to engage and support the undersurface of the flat glass as the latter is laid upon the open mold. In cases where the shape of the bend permits, the mold may be cut and hinged in such a manner that the outboard extremities of the center section of the mold act as intermediate support points for the flat glass. It is also possible that certain simpler glass bends can be obtained on a mold of the type described wherein the inboard extremities of the wing sections are utilized to support the flat glass before bending. However, such a structure is not preferred for producing complex bends because of the difficulty of obtaining a mold opening position such that the flat glass sits low in the open mold on a horizontal plane.

Another benefit obtained from the provision of intermediate supports is to eliminate the tendency of the glass to pivot about a longitudinal axis substantially parallel with the span formed by the glass across the mold due to the fact that the center of gravity of the glass is outside the axis defined by the support points provided by the mold extremities. At least one intermediate support point is required to be on the opposite side of the center of gravity from the axis of support provided by the longitudinal mold extremities in order to preclude such transverse pivoting, which results in transverse misalignment and rejectable bends.

The size of the bending moments provided to close the mold is very important. These moments should be sufficiently small so that the weight of the glass upon the open mold more than compensates for the tendency for the mold to close. As the glass and the mold are heated in a bending lehr, the heated glass sags to conform to the mold, especially its center portion, thus reducing the counterbalancing force of the weight of the glass. Toward the end of the bending operation when a large portion of the glass weight is supported on the central portion of the mold and the glass has softened sufficiently to permit its shaping, the bending moments tending to close the mold operate to rotate the wing portions into closed position, thereby raising the end portions of the glass into conformity with the wings of the mold. Bending moments of the proper magnitude insure that the wings are closed at the proper phase of the bending cycle.

Further precautions are sometimes required when it is desired to twist the longitudinal extremities of the glass relative to the cylindrical curve imparted centrally. This is accomplished by cutting each of the counterweighted wing sections to provide at least two mold sections flanking each longitudinal extremity of the center section.

The flat glass is primarily supported at the longitudinal outboard extremities of the fixed center section in this embodiment. Thus, the extremities of the glass are supported at a plurality of points during the lifting operation, thereby providing more intimate localized control of the glass bending in these regions, thus enabling the extremities of the glass to be bent into conical bends wherein one lateral edge of a glass extremity is rotated to a greater degree than the other lateral edge of the extremity. Such molds are also useful in bending extremely pointed glass sheets and glass sheets whose longitudinal axis extending between the extremities of the glass falls outside the center of gravity.

The non-localized distribution of the upward bending force provided by the additional molding members minimizes the tendency of the extremities of the glass to overbend or be rotated more than the amount desired. In addition, the comparatively small span between the various points of application of the upward thrust to each extremity of the glass minimizes any tendency for reverse sagging that may be present when an upward thrust is applied at each glass extremity at a single point spaced from the fixed support points.

A primary object of the present invention is to provide an improved method and apparatus for bending glass to hitherto unattainable curvatures efficiently, especially glass sheets having dimensions greater than the maximum sizes previously bent.

This and other objects will be apparent upon reading the following description of certain specific embodiments of various aspects of my invention, which embodiments are described for the purposes of illustration rather than limitation.

In the drawings, constituting a part of the description of the present invention.

Referring to the drawings, reference number 20 depicts a mold carrying frame or mold support means provided with a pair of spaced longitudinal side members 22 of L-shaped configuration and a pair of cross members 24 connecting the ends of the side members. The cross members also may be L-shaped in configuration for additional rigidity. A mold 30 comprising a pair of laterally spaced interconnected, longitudinally extending rails 31 forming a main central section 32 and additional curved rails 33, each forming one of a pair of spaced wing sections 34, is supported at its central portion 32 by fixed attachement as by spot welding to intermediate transverse members 26 connected to the longitudinally extending members 22 of the mold supporting frame 20.

Each rail 31 extends longitudinally of the mold 30 along one of the longitudinal side edges thereof between its longitudinal extremities 72. Each wing portion 34 has an outboard longitudinal extremity 35 at a longitudinal extremity of the mold 30 and an inboard longitudinal extremity 74 at each longitudinal extremity of its curved rail 33.

The upper surface 36 of the main central section 32 and the upper surface 38 of the wing sections 34 are shaped to the contour desired for the corresponding portions of the bent glass sheet. Transversely extending braces 40 interconnect the opposing sides of the rails 31 of center section 32, while similar braces 42 interconnect the opposing longitudinal sides of the rails 33 forming each of the wing sections 34 to improve the rigidity of the mold structure. These braces are preferably removed as far as possible from surfaces 36 and 38 in order to minimize localized heat variations to which adjacent portions of the glass sheet are subjected. In addition, the mold sections 32 and 34 may be serrated at the surfaces 36 and 38 respectively to provide passages for the escape of air blown against the glass during subsequent operations.

Figure 1:
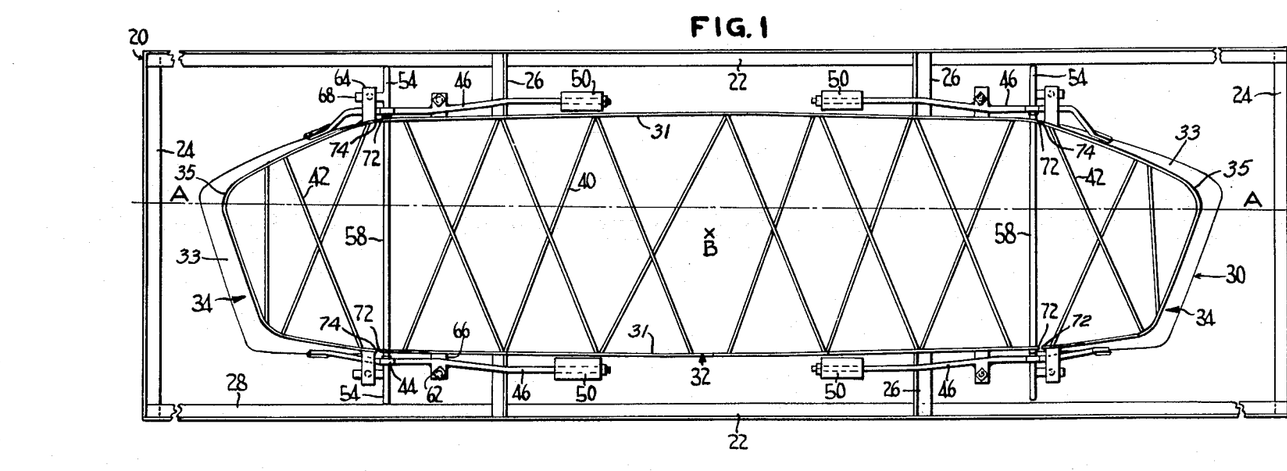
FIGURE 1 is a plan view of one embodiment of the present invention.
Figure 2:
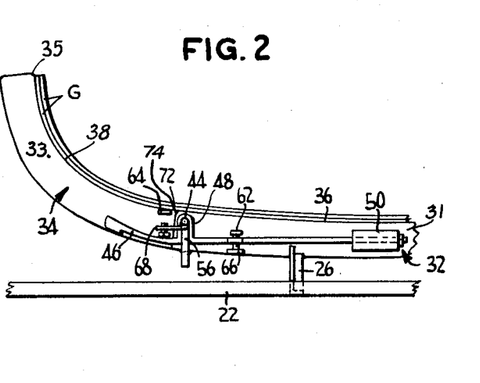
FIGURE 2 is a side elevation view of one end of the mold shown in FIGURE 1 showing the mold in closed position.
Figure 3:
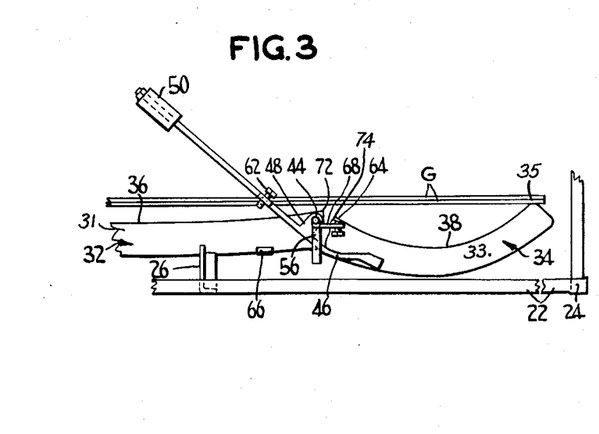
FIGURE 3 is a side elevation view of the other side of the bending mold shown in FIGURE 1 depicting the mold in open position.

Wing sections 34 are pivoted about hinges or pivot means 44. The latter are shown in FIGURES 1 through 5 properly fixed in position relative to the center section 32 at locations longitudinally inboard of its longitudinal extremities 72 and below its upper shaping surface 36. As shown in FIGS. 1, 2 and 3, lever arms 46 provided with ears 48 are fixed to wing members 34 to serve as extension means which provide a connection between members 34 and the hinges 44 at the ears 48. Each of the lever arms or extension means has a weight 50 at its inboard end.

In the embodiment shown in these figures, pivot rods 54 interconnecting laterally spaced hinges 44 are fixed to the center section of the mold and provided with a depending portion 56 for supporting the central portion 58 of the hinge rod below the level of the mold shaping surface, thus increasing the distance between the hinge rod and the glass to minimize local heat shielding of the neighboring portions of the glass in the bending lehr. Suitable stop members 62 and 64 are provided to limit the opening and closing movement of the wing portions. Stop member 62 on the weighted lever arm 46 comes into engagement with flange 66 extending laterally outwardly from center mold section 32 to limit the closing movement of the wing sections 34. Stop members 64 abut adjustable stops 68 extending from the fixed hinge rod 54 to limit opening of the mold.

In operation, one or more flat sheets of glass G are mounted on the mold after the latter is placed in an open position in which the longitudinal inboard extremities 74 of wing sections 34 are separated from the longitudinal extremities 72 of the rails 31 of the center mold section. The flat glass acts as a beam to hold the wing sections 34 in the open mold position. The glass and the mold are then conveyed into a bending lehr where the glass and the mold are gradually heated to prevent thermal shock. The glass may be heated more intensely in the zones of more extreme bends. The glass, which was rigid while cold, softens upon the application of heat. The moments provided by the weighted moment arms 46 are thus enabled to rotate the wing sections 34 into positions where their longitudinal inboard extremities 74 are adjacent the longitudinal extremities 72 of the rails 31 of the center mold section 32, thus closing the mold.

As the glass softens, its central portion sags by gravity to conform to the central portion of rails 31 of the center section 32 of the mold with a minimum of downward vertical displacement. The extremities of the softened glass are raised from their initial position shown in FIG. 3 to that shown in FIG. 2. As stated previously, this provision of a partial lifting and a partial sagging of the glass sheet due to its initial low position in the mold provides a minimum relative sliding between the mold and the glass.

Another important aspect of the present invention is the determination of the proper lifting moments to be applied to the extremities of the heat softened glass. The bending moments provided by the weighted lever arms 46 should be too small to overcome the entire weight of the glass sheet, but should be large enough to overcome the weight of the extremities of the glass extending outwardly of points 72 of the center mold section 30. By providing the proper size moment arms, the glass is enabled to sag into partial conformity with the rails 31 of the center mold section before the wing sections begin to rotate to lift the extremities of the glass. In other words, the unbent glass sheet acts as a beam when mounted upon the open mold, thus serving to maintain the mold open by its mass until the glass softens upon the application of heat.

Proper bending moments can be provided by either increasing the size of the weights 50 or increasing the length of the lever arms 46. Too much mass of metal within the bending lehr impairs the efficiency of the bending operation since a greater proportion of the heat supplied by the bending lehr is utilized in heating the mold rather than glass. Therefore, care must be exercised in keeping the size of the weights 50 down to a minimum commensurate with the necessity for providing a bending moment of the proper magnitude and providing that the length of the lever arm 46 is not so great that it interferes with the placement of the flat glass sheets onto the mold before bending and removal of the bent glass sheets after bending. Undue length of the lever arms may also necessitate increasing the size of the bending lehr, particularly in the height dimension, to such an extent that inefficient heating results.

As seen in FIGURES 1, 2 and 3, the hinge rods 54 traverse the mold in a plane perpendicular to the longitudinal axis of the mold. This provides a cylindrical rotation of the wing sections 34 relative to the center section 32. Except for very exceptional cases, each extremity of the flat glass sheet G is supported at a wing point at the extremity of the mold. For certain extreme shapes, where the longitudinal extremity of the mold is located adjacent one side thereof, such point support fails to provide adequate support for bending the extremities of the glass properly, because of the tendency of the glass to become kinked as will be explained in more detail below.

Figure 4:
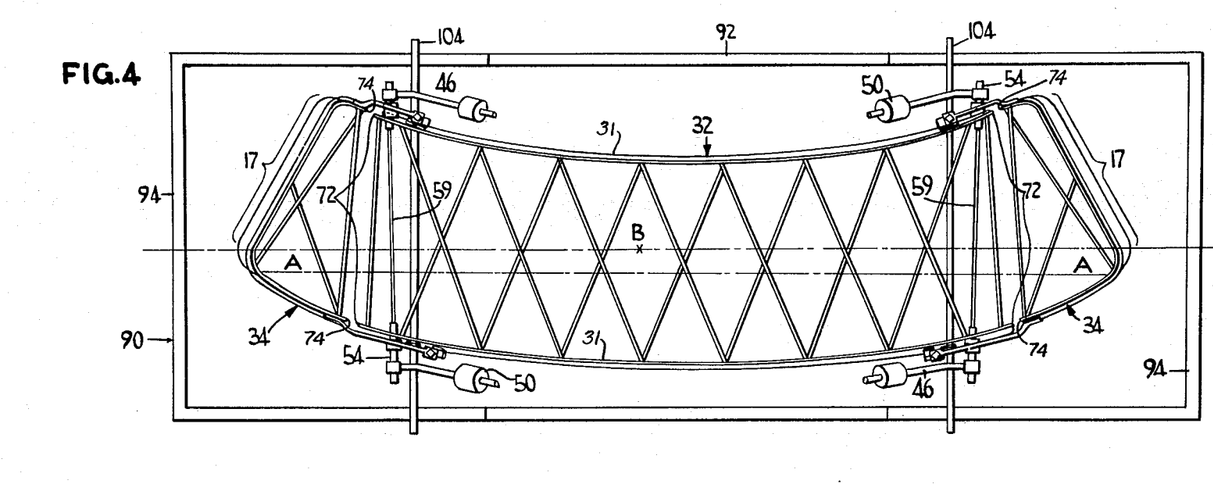
FIGURE 4 is a view similar to FIGURE 1 showing an alternate embodiment of the present invention.
Figure 5:
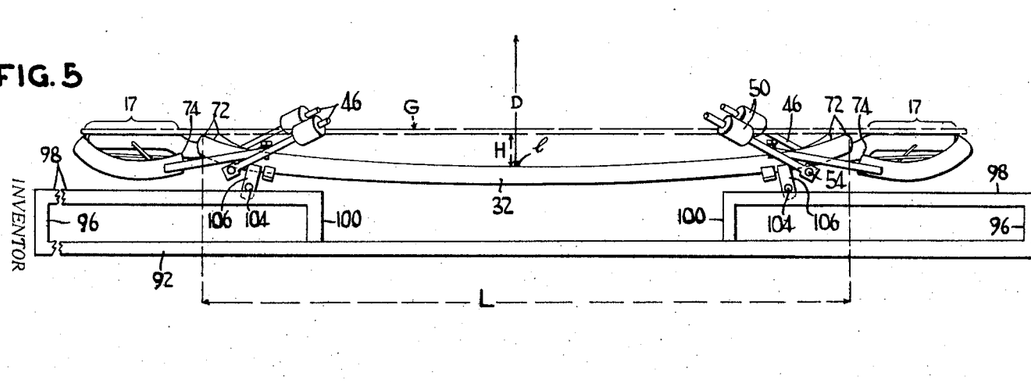
FIGURE 5 is a side elevational view of the mold of FIGURE 4 in open position receiving a flat sheet of glass prior to bending.

As seen in the embodiment shown in FIGS. 4 and 5, provision is made to open the mold so that the wing sections 34 each support the flat glass sheet along a line 17 that extends along a substantial portion of the length of its shaping surface 38. This line of support is preferably chosen to be in the horizontal plane defined by the extremities 72 of the rails 31 of mold section 32. Under such conditions, it usually becomes necessary for the hinge rods 54 or the axis in which laterally spaced hinges 44 are located to extend across the mold in a plane that is oblique to the longitudinal axis of the mold. Referring to FIG. 4, it is seen that the center portion 59 of the hinge rods 54 are made thinner in order to minimize localized variations in glass heating due to absorption of heat from the hinge rods.

The frame member 90 shown in FIGURES 4 through 7 comprises longitudinally extending members 92 interconnected by cross members 94 connecting the ends of the side members, vertically extending props 96 at each corner of the frame for supporting a plurality of mold support beams 98 which extend inwardly beyond the transverse lines defined by the extremities 72 of the mold sections 32. Additional vertical support rods 100 are provided to maintain the beams 98 substantially parallel with the longitudinally extending members 92.

Transversely extending rods 104 which are secured in fixed relation to center portion 32 of the bending mold 30 by means of support plates 106 are provided to load the bending mold on the beams 98 of the supporting frame 90. The hinge rods 54, 59 are located to provide a conical bend for the glass extremities supported by the wings 34 rather than the cylindrical bend produced by the embodiment depicted in FIGS. 1, 2 and 3. The provision of conical type hinges permits the mold to open to the correct length, preferably about ½″ shorter than the length of the flat glass sheet, which is preferably already cut to the outline desired for the bent glass sheet, enables proper registry of the mold ends with the extremities of the flat glass, provides proper support of the glass upon the center section of the mold, while enabling the glass to be carried comparatively low in the open mold, preferably not over 2½ inches separating the lower surface of the flat glass from the deepest portion 1 of the mold. As seen in FIGURE 5, the flat glass is supported at the extremities 72 of the fixed central mold section 32 and along the lines 17 adjacent the extremity of each wing section 34.

Figure 6:
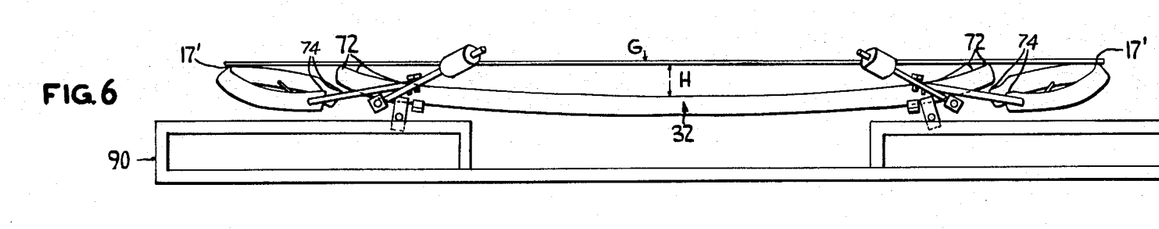
FIGURES 6 and 7 are views similar to FIGURE 5 showing two disadvantages resulting from improper placement of the hinges and/or cutting points of a mold used to bend large sheets of glass to complex curvatures.

In FIGURE 6, a side elevation view similar to that of FIG. 5 shows how most glass sheets are supported in molds provided with cylindrical hinges when it is desired to use the extremities 72 of the rails 31 of the center section 32 as intermediate points of support for the flat glass in the open mold. Instead of supporting the glass extremities along a line 17 as shown in FIGURES 4 and 5, the extremities of the glass are supported at a single point 17′. For some shapes of glass, this single point of support provides insufficient support for the glass extremities, thus allowing the glass to sag downwardly in a region in which it is desired to bend the glass upwardly. With certain extreme shapes, kinks are imparted to the glass extremities. Therefore, for certain shapes it is desirable to maintain a line contact rather than a point contact between the wing sections and the extremities of the glass. On the other hand, for most glass shapes this additional precaution is unnecessary and the use of cylindrical hinges is recommended because of the greater ease of fabrication.

Figure 7:
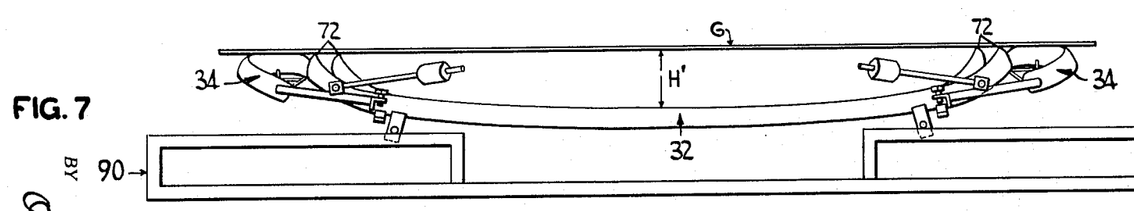

FIGURE 7 is a side elevation of a mold such as depicted in FIGURES 4 and 5 wherein the mold is cut and hinged at incorrect locations. Specifically, the center section 32 is too long whenever it extends outwardly beyond the region where the radius of the bend diminishes sharply. Due to the incorrect cutting, the angle formed between the extremity 72 of the mold section 32 and the bottom surface of the flat glass G is so great that the glass is easily marked as it softens and slides to conform to the mold. The high angle between the glass and the surfaces at points 72 make it more likely that one extremity of the glass is likely to slide faster than the other to cause the glass to shift longitudinally of the mold.

When each extremity of the glass extends beyond the extremities of the wing sections 34 by more than the desired maximum amount due to insufficient opening of the mold because of improper hinging, the extremities of the glass tend to be bent downwardly by heat rather than upwardly as desired. Furthermore, the improper location of the points of hinging and cutting the mold results in the flat glass setting in a relatively high position compared to the central section 32 of the mold. This increases the tendency of the glass to be misaligned relative to the mold and also results in more than the desired amount of sliding action between the glass sheet and the mold as the glass is bent and the mold closed, since such glass positioning provides a minimum of upward lifting of the extremities of the glass sheet.

In order to provide a mathematical criterion for determining the maximum height the flat glass is allowed to set above the mold, please refer to FIGS. 5 and 7. If L is the longitudinal straight line distance between points 72 at the extremes of the center mold section 32 and H the vertical distance between the bottom surface of flat glass G and the lowermost point 1 on surface 36 of the mold section, L must be at least 15 times the distance H. Thus H′ in FIG. 7 is too great by this criterion.

Another mathematical criterion for the maximum height the flat glass is allowed to set above the open mold is expressed in terms of the depth D of the glass bend. H is required to be a minor proportion of or less than one-half of D, and preferably less than 25% of D. The desired bending cycle involving minimum central glass sagging combined with maximum possible lifting at the glass extremities results in minimum relative sliding between the glass and the mold when the glass to be bent to shallow central curvatures merging into extreme curvatures is supported on the open mold in closest possible adjacency to the deepest portion of the surface of the fixed central molding section.

It is understood that the mold structure described in connection with the embodiment of FIGURES 4 and 5 may be used interchangeably with the mold supporting frame structure described in connection with the embodiment of FIGURES 1, 2 and 3. Also, it is understood that either the offset type of hinge rods or the hinge rods having central portions of reduced thickness may be used with any of the embodiments described herein.

Referring to FIGURES 8 through 14, apparatus capable of subjecting each extremity of a heat-softened glass sheet outboard of its central portion supported relatively close to the lowest portion of a concave shaping surface to spaced upward thrusts according to the principles of my invention is depicted. A description of the specific apparatus which is the subject matter of application Serial No. 827,985 of Lloyd V. Black and Harold E. McKelvey, filed June 3, 1959, follows to facilitate the reader's understanding of the method according to my invention. In such apparatus, a mold is provided with a central molding member 110 containing a pair of longitudinally spaced laterally disposed bars 112 extending beyond the mold and adapted for fixed securement upon a mold carrying frame provided with L-shaped longitudinal members 114 and interconnecting reinforcing members 116. Vertically extending posts 118 are provided to carry a superstructure 120 at each longitudinal extremity of the mold carrying frame. Each superstructure contains a plurality of laterally opposed grooves 122 designed to support the bars 112 in fixed relation.

A counterweighted molding member 124 provided with a pair of outriggers 126 extending inwardly at either side thereof is located at each end of center molding member 110. These outriggers are hinged to a hinge rod 128 attached by arms 129 to either end of the cross bars 112. The inboard end of each outrigger contains a lever arm 130 provided with a counterweight 132. The outboard ends of counterweighted portion 124 are each provided with an outwardly extending outrigger 136 attached at its outboard extremity to a cradle hinge 138. An extreme molding member 140 cut from counterweighted member 124 is mounted for free rotation upon each cradle hinge. Guide members 142 are attached to the outboard extremity of each extreme molding member 140 for guiding the location of a flat glass sheet.

The center section 110 is provided with a stop member 144 for engagement with outrigger 126 to limit the closing rotation of the counterweighted member 124. Similarly, a stop member 146 extends laterally of the end molding member 140 to engage an abutment 148 on outrigger 136 to limit the closing movement of the end molding member.

Figures 8, 9, 11, 12:
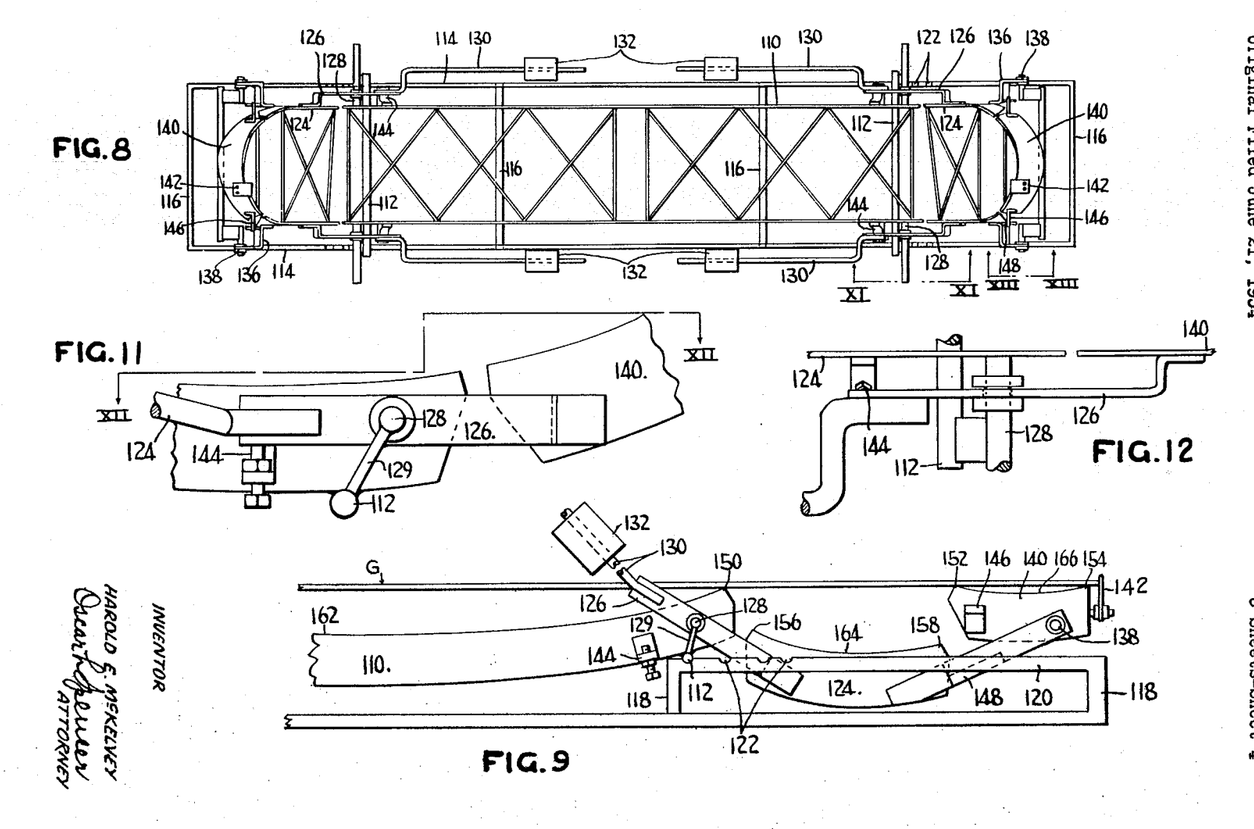
FIGURE 8 is a plan view of another embodiment of the present invention showing the mold in closed position.
FIGURE 9 is a partial side elevational view of the mold seen in FIGURE 8 showing the mold in open position receiving a flat sheet of glass.
FIGURE 11 is an enlarged side elevational view along the lines XI—XI of FIGURE 8.
FIGURE 12 is a view along the lines XII—XII of FIGURE 11.

In operation, a flat sheet of glass G is mounted on the open mold in the manner shown in FIGURE 12 so that the glass is supported at points 150 at both outboard extremities of the center molding member 110 and at points 152 and 154 at the inboard and outboard extremities respectively of the extreme members 140. The latter molding members are so pivoted and cut that the mold opens outwardly to a length equalling that of the flat glass sheet G and supporting points 150, 152 and 154 are provided to support either extremity of the flat glass.

The loaded mold is conveyed into a bending lehr where heat is supplied to the glass. Upon the application of heat, the glass softens, thus tending to sag to conform to the skeleton shape of the mold. As the glass sags, molding members 124 and 140 are rotated upwardly due to the bending moment provided by the counterweights 132. End molding member 140 is free to pivot about the cradle hinge rods 138, and is so pivoted that end 152 tends to rotate downwardly and end 154 upwardly with respect to the axis defined by the ends of hing rods 138. Thus, as the counterweighted portions 124 and 140 are rotated upwardly about hinges 128 as the glass softens, the glass, initially supported at points 152 and 154 also is supported at points 156 and 158 at the inboard and outboard extremities of counterweighted member 124. As the bending cycle continues, rotation of the members 124 and 140 continues until the glass is supported along a continuous surface defined by upper surfaces 162, 164 and 166 of molding members 110, 124 and 140 respectively.

Figures 10, 13, 14, 15:
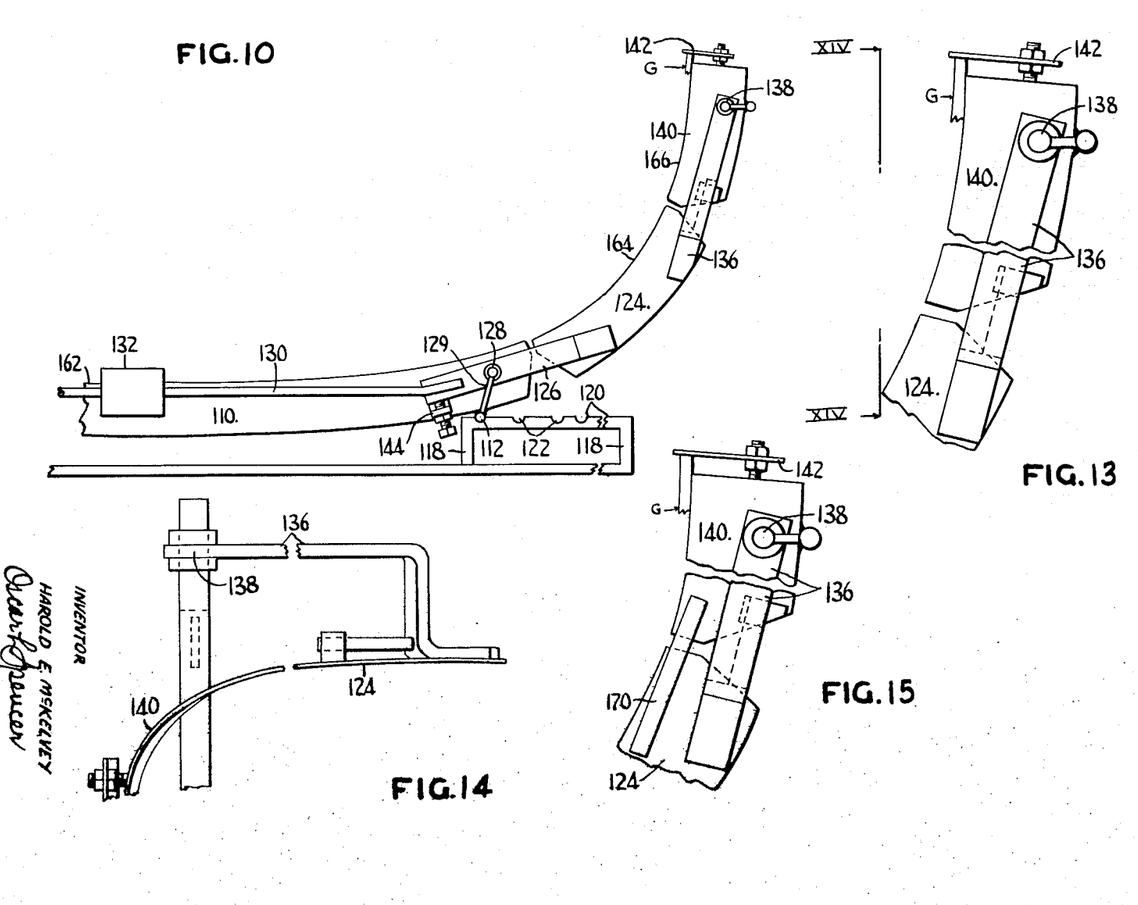
FIGURE 10 is a view similar to FIGURE 9 showing the mold in closed position.
FIGURE 13 is an enlarged sectional view taken along lines XIII—XIII of FIGURE 8.
FIGURE 14 is a view taken along the lines XIV—XIV of FIGURE 13.
FIGURE 15 is a view similar to FIGURE 13 showing still another modification of the present invention.

It is sometimes difficult for end members 140 to rotate into position to provide a continuous closed surface for the mold when the end members are free to rotate. In such cases, the glass bending is incomplete. As seen in FIGURE 15 a rod 170, which may be provided with a small counterweight, is added in order to enhance the tendency of end molding member 140 to rotate to closed position.

The embodiments depicted in FIGURES 8 through 15 impart an additional degree of flexibility to the curvatures obtainable from a bending mold not as easily obtainable with the molds shown in FIGURES 1 through 7. The latter species also insure that flat glass is positioned on the mold initially in closest possible proximity to the lowest point on the molding surface of the center molding member. By hinging the extreme molding members 140 conically rather than cylindrically, the lateral edges of the glass extremities can be twisted with respect to each other during the glass bending operation, as the glass is softened by heating and the mold is rotated from its open to its closed position.

The latter embodiment of mold structure is also advantageous in bending flat sheets of glass whose ends are extremely pointed, since the plurality of thrust points provided for lifting the glass during the latter stages of glass bending minimizes the unsupported span lengths of heat softened glass, thus lessening any tendency of the glass to sag or kink during this critical phase of the bending cycle. In addition, the additional flexibility of providing freely rotatable extreme molding members facilitates bending glass sheets whose longitudinal axis extending between the extremities of the glass falls outside its center of gravity by providing additional spaced points of support on either side of the longitudinal axis passing through the center of gravity.

In the above description and in the accompanying claims, the terms "cuts" and "cut points" are not intended to refer to the manner of fabricating the mold, but to provide a term to describe the location of the extremities of the various mold sections or molding members which lie in juxtaposition when the molds are closed. Each molding member may be fabricated individually and the individual members assembled to form the mold, or the mold may be formed initially as a unitary structure and the individual sections cut therefrom. The specific manner of making the molds forms no part of the present invention.

Various embodiments of apparatus capable of bending flat sheets of glass into various complex shapes by utilizing my novel principle have been presented. This principle involves utilizing a mold of such a structure that flat glass is placed in as low a position as possible in the mold to provide a minimum of vertical sagging and the extremities of the mold lift the extremities of the glass to shape the glass to that defined by the mold in closed position. The embodiments described illustrate several applications of this principle. However, the scope of the present invention is not limited to the particular structural features described except as limited by the accompanying claims.

What is claimed is:

1. In the art of bending glass sheets wherein a flat glass sheet is conformed to a sectionalized upper surface of concave elevation of a sectionalized mold by a combination of heat-sagging the sheet and supporting and lifting a longitudinal extremity thereof upwardly, the improvement comprising supporting said flat glass sheet in spaced relation above the inner extremity of each end section at additional points spaced from each said longitudinal extremity and adjacent the side edges of said sheet on an extremity of a section of said shaping surface other than any end section of said mold heating said glass sheet to the softening temperature thereof to permit said sheet to sag and conform to the shape of said supporting section of said mold, and lifting the longitudinal extremity of said glass sheet extending from the points at which said glass sheet is supported and beyond said supporting section of said mold to conform said glass sheet to the shape of said sectionalized shaping surface by said combination of heat-sagging and upward lifting.

2. In the art of bending a glass sheet into conformity with an upper shaping surface of a sectionalized glass sheet bending mold by supporting the glass sheet while unbent in bending relation to said shaping surface and heating the glass sheet to a temperature sufficient to soften the glass sheet sufficiently to conform the latter to the upper shaping surface of said mold, the improvement comprising supporting the unbent glass sheet prior to bending in spaced relation above the inner extremity of each end mold section intermediate its longitudinal extremities and adjacent its longitudinal side edges on the longitudinal extremities of a section of any mold other than said end section and heating said glass sheet to a temperature sufficient to permit said sheet to sag and conform to the shape of said supporting section of said mold and, while said glass sheet is so heated, lifting the longitudinal extremity of said glass sheet extending from the points at which said glass sheet is supported and beyond said supporting section of said mold to conform said glass sheet to the shape of said sectionalized shaping surface by said combination heat sagging and upward lifting.

3. In a glass sheet bending mold having at least two sections arranged in end-to-end relationship, one of said sections constituting a terminal section permanently located at an end of the mold, the other of said sections being an adjacent concave section of the mold, said terminal section of the mold being pivotable on hinge means from an open to a closed position with respect to said other section and in closed position forming a substantially continuous concave upper shaping surface conforming to the ultimate shape desired, the improvement wherein the hinge means about which the terminal section is pivotable is located in such a position relative to the adjacent extremities of said two sections that in the open position the inboard extremity of the shaping surface of the terminal section lies in a plane below the plane in which the adjacent extremity of the shaping surface of the adjacent concave section lies, whereby in use an unbent glass sheet is supported intermediate its longitudinal extremities on the extremity of said concave mold section adjacent the terminal section in spaced relation above the inner extremity of said terminal section.

4. In a glass sheet bending mold having at least two sections arranged in end-to-end relationship, one of said sections constituting a terminal section permanently located at an end of the mold, the other of said sections being an adjacent concave section of the mold, said terminal section of the mold being pivotable on hinge means from an open to a closed position with respect to said other section and in closed position forming a substantially continuous concave upper shaping surface conforming to the ultimate shape desired, the improvement wherein the hinge means about which the terminal section is pivotable is located below the shaping surface and longitudinally inward of the outboard longitudinal extremity of said adjacent concave mold section so that in the open position the inboard extremity of the shaping surface of the terminal section lies in a plane below the plane in which the adjacent extremity of the shaping surface of the adjacent concave section lies, whereby in use an unbent glass sheet is supported intermediate its longitudinal extremities on the extremity of the concave section of the mold adjacent the terminal section.

5. In a sectionalized glass sheet bending mold having a main concave section and a wing section arranged in end-to-end relationship with each longitudinal outboard extremity of said main concave section, said sections having shaping surfaces facing permanently upward, each wing section being pivotable on hinge means from an open to a closed position with respect to the main concave section and in closed position forming the permanently end a substantially continuous concave upper shaping surface conforming to the ultimate shape desired, the improvement wherein the hinge means about which each of said wing sections is pivotable is located in such a position relative to the longitudinal outboard extremity of said main concave section adjacent the inboard extremity of said wing section that in the open position the inboard extremity of the shaping surface of each said wing section lies in a plane below the plane in which the adjacent extremity of the shaping surface of the main concave section lies, whereby in use an unbent glass sheet is supported intermediate its longitudinal extremities on the extremities of the main concave mold section.

References Cited by the Examiner

UNITED STATES PATENTS

| | | | |
|---|---|---|---|
| 760,959 | 5/1904 | Connington | 65—185 |
| 2,330,349 | 9/1943 | Galey | 65—291 |
| 2,551,607 | 5/1951 | Jendrisak | 65—291 |
| 2,590,768 | 3/1952 | Guilleminat et al. | 65—287 X |
| 2,695,476 | 11/1954 | Jendrisak | 65—290 |
| 2,736,140 | 2/1956 | Black | 65—291 |
| 2,814,164 | 11/1957 | Carson et al. | 65—290 |
| 2,936,550 | 5/1960 | Carson | 65—290 |

DONALL H. SYLVESTER, *Primary Examiner.*

CHARLES R. HODGES, ARTHUR P. KENT,
*Examiners.*

F. W. MIGA, *Assistant Examiner.*